United States Patent [19]

Ryall

[11] 4,143,999
[45] Mar. 13, 1979

[54] FLUID MACHINES

[75] Inventor: Michael L. Ryall, Glasgow, Scotland

[73] Assignee: Weir Pumps Limited, Glasgow, Scotland

[21] Appl. No.: 796,020

[22] Filed: May 11, 1977

Related U.S. Application Data

[63] Continuation-in-part of Ser. No. 561,058, Mar. 24, 1975, abandoned.

[30] Foreign Application Priority Data

Apr. 9, 1974 [GB] United Kingdom ............ 15563/74
Sep. 24, 1974 [GB] United Kingdom ............ 41472/74

[51] Int. Cl.² .......................................... F04B 17/00
[52] U.S. Cl. ................................... 417/424; 415/72; 415/88; 416/177
[58] Field of Search ............... 416/177, 176; 415/88, 415/72, 71, 60-62, 208-210; 417/424, 66, 67, 70, 71, 72; 261/91

[56] References Cited

U.S. PATENT DOCUMENTS

| | | | |
|---|---|---|---|
| 1,020,382 | 3/1912 | Alpha | 416/177 |
| 1,476,210 | 12/1923 | Moody | 415/500 |
| 1,712,184 | 5/1929 | Wendel | 415/88 |
| 2,444,000 | 6/1948 | Younger | 416/177 |
| 3,221,661 | 12/1965 | Swearingen | 417/424 |
| 3,299,820 | 1/1967 | Campbell | 415/72 |
| 3,495,813 | 2/1970 | Marenghi et l. | 261/91 X |
| 3,846,516 | 11/1974 | Carlson | 261/91 X |
| 3,865,721 | 2/1975 | Kaelin | 261/91 X |
| 3,875,279 | 4/1975 | Kaelin | 261/91 |
| 3,958,723 | 5/1976 | Stahle | 415/72 X |

FOREIGN PATENT DOCUMENTS

T 12/1873 Italy .......................................... 415/88

*Primary Examiner*—Carlton R. Croyle
*Assistant Examiner*—Edward Look
*Attorney, Agent, or Firm*—Mason, Fenwick & Lawrence

[57] ABSTRACT

A pump for low head duties includes an impeller portion and a diffuser portion which together define the entire liquid retaining and guidance means between the inlet and the outlet, the impeller serving to raise liquid from a lower reservoir and having a plurality of spiral passages therethrough in which, in operation, a free liquid surface vortex is enabled to form, the diffuser portion leading from the impeller outlet having a rotatable section and an upwardly increasing diameter. The impeller comprising vanes having leading edges extending downwardly and outwardly to provide a liquid inlet providing a substantially unobstructed entry to the vanes and automatic control of the quantity of liquid pumped according to the level of liquid in the lower reservoir. The diffuser portion is driven separately at a speed less than the impeller.

10 Claims, 1 Drawing Figure

U.S. Patent
Mar. 13, 1979
4,143,999
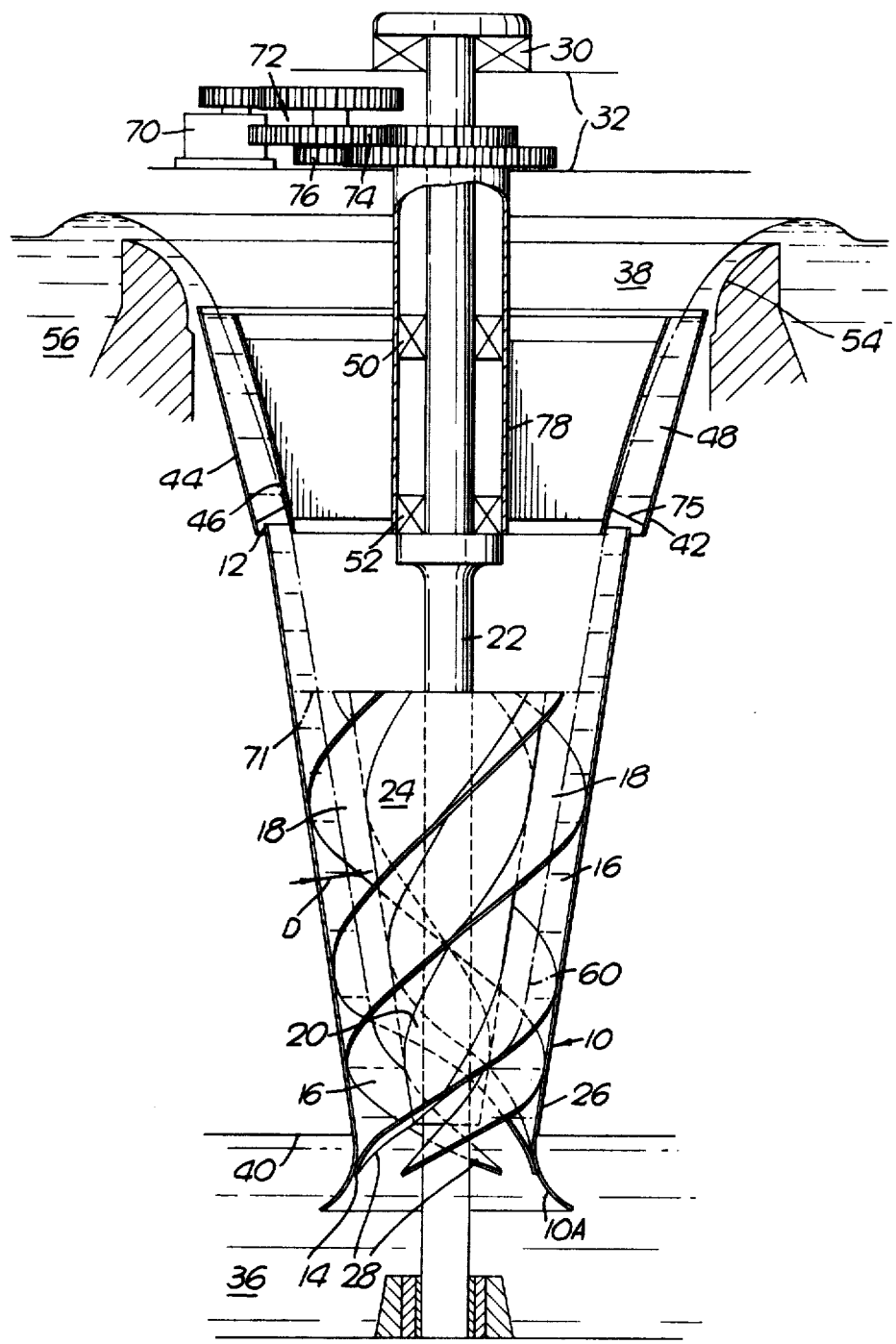

FLUID MACHINES

The present application is a continuation-in-part of application Ser. No. 561,058 now abandoned filed Mar. 24, 1975.

The present invention relates to fluid pumps for comparatively low head duties and particularly to rotary cone pumps. Typical of the duties for which the invention is applicable are pumps for land drainage, sewerage and effluent systems.

Known types of pumps for low head pumping duties are mixed-flow and axial-flow pumps, of the volute casing or bowl type, and Archimedean screw positive displacement pumps. It is a feature of the operating conditions of these pumps that the incoming flow to the suction sump, from which the pumps draw, may vary widely in quantity as a result particularly of variations in rainfall and effluent. This means that for efficient pumping installations, involving the minimum of power consumption, the pumps must either be capable of efficient operation at low flow rates, or a multiplicity of pumps must be installed and run in parallel, as the incoming flow demands, or a storage reservoir must be constructed at the pump suction to permit intermittent pump operation.

It is a further feature of these pumping duties that the incoming flow may contain a significant quantity of solids in suspension, some of which may be abrasive in nature, and quite large solid lumps may be swept into the suction pump, particularly at times of heavy rainfall and when the specific gravity of these solid materials is close to that of water.

For these low head pumping duties, Archimedean screw pumps are often used. These are large, slow running, positive displacement pumps, which are therefore inherently expensive. They have to be carefully fitted to the sloping channels in which they operate with the minimum amount of clearance between the rotor and the channel, to ensure reasonably efficient operation, and this involves substantial civil and mechanical engineering costs. They have the advantage of fairly high efficiency over a wide flow range, since the power absorbed by a positive displacement pump reduces as the flow rate reduces. Maintenance of this high efficiency is, however, dependent on the operating clearance between the rotor and the channel remaining small in service, and the adoption of low rotational speeds to minimise fluid friction on the large surfaces. Since the water pumped often contains abrasive particles, the clearance tends to increase with time. Furthermore, it is impossible to maintain the same clearance under low flow conditions as at full flow, since at full flow the water being pumped exerts a downward force on the rotor, causing the rotor to deflect, the clearance being chosen to be a minimum at maximum deflection. At low flows the weight of water is less, and so the deflection of the rotor is less, and clearances increase. This has an adverse effect on efficiency and power consumption at low flows.

Axial flow pumps when used for these pumping duties can only be designed such that the power absorbed by the pumps at constant speed increases as the flow through the pumps decreases. Mixed flow pumps have similar problems in that they too cannot readily be designed at constant speed to absorb less power as the flow through the pump decreases. To improve the power characteristics of these pumps, when operating against a nearly constant head, as in many land drainage and sewerage schemes, variable speed drive is often incorporated, which involves the use of an expensive commutator motor, fluid coupling, or other system. Axial and mixed flow pumps also require special attention to inlet sump construction, or storage reservoirs to deal with wide variation in flow efficiently and to provide suitable suction conditions. These factors can lead to high civil engineering costs.

With prior rotodynamic pumps, as described above, it has been necessary to provide pipework or equivalent fluid guidance means between the outlet from the pump, which is usually either below or only slightly above the level of fluid in the inlet sump, and the level to which fluid is to be pumped, this generally being anything upwards of two meters above the inlet level.

This additional pipework must be provided at additional cost to that of the pump itself, and furthermore to obtain suitable inlet conditions for certain prior rotodynamic pumps the inlet sump has had to be carefully designed and expensively constructed, for example, it may have to be relatively deep, to avoid entrainment of air vortices at the pump suction pipe inlet.

It is an object of the present invention to obviate or mitigate the disadvantages exhibited by known machines for the low head pumping duties outlined above.

Further it is an object of the present invention to provide a drive transmission for coupling diffuser means of a rotary cone pump to a drive motor so that the diffuser means is driven by the drive motor; and preferably the diffuser means is driven at a speed less than the rotor of the pump.

It is a further object of the present invention to reduce the depth of the free liquid vortex on the outer shroud of a rotary cone pump when the level of liquid in which the pump is immersed falls below a predetermined value to control the quantity of liquid pumped dependent on said level.

Embodiments of the present invention will now be described by way of example with reference to the accompanying drawing which comprises a cross-sectional elevation of the preferred embodiment of the invention in the form of a rotodynamic pump for comparatively low head duties.

A rotodynamic cone pump, includes a circular cross-section, hollow, thin walled rotor or impeller 10 mounted substantially vertically. This impeller is open at the bottom and at the top. The actual shape of the impeller may vary considerably, but in the embodiment the internal diameter of the top 12 is greater than the internal diameter at the bottom 14 and increases continually from the bottom to the top. Thus, the rotor impeller 10 is of hollow conical shape.

Attached to the impeller in the annular chamber 16 therethrough are vanes 18 of spiral form. These vanes 18 are positioned so that they extend from a level at or near the bottom 14 of the rotor 10, to a level 71 preferably a short distance below the top 12 of the rotor to define spiral passages therealong. In the embodiment illustrated in FIG. 1, the vanes 18 are attached at their inner edges, at the lower part of the impeller 10, to a hub 20 mounted on and driven by a vertical drive shaft 22. Further rigidity is given to the rotating impeller by an inside shroud 24 attached to the spiral vanes 18 above the hub 20. An outside shroud 26 extends below the lower end of the hub 11 and the vanes 18 attached to the shroud 26 have leading ends 28 which are inclined as they extend radially inwardly from the outer shroud 26 to the hub 20.

The drive shaft 22 rotates in an upper radial/thrust bearing 30 mounted in a rigid bearing frame 31. The lower end of the shaft 2 is supported, in a radial bearing 34 mounted in the sump 36 for the pump.

The entire pump is suspended from the frame 32 inside an aperture 38 formed in a concrete guide section 54 hanging vertically downwards. The aperture 38 is circular in plan view, and converges from top to bottom. The inverted bell-mouth shape of the convergent surface is important for efficient operation of the pump.

The pump impeller 10 is mounted such that, at its lower end 14, it penetrates below the surface 40 of the liquid in the sump 36 from which it draws suction. It is important that both the outer shroud 26 and the ends 28 of the vanes 18 penetrate this surface. Specifically, the ends 28 diverge downwardly to provide the vanes 18 with substantially downwardly extending portions 28A. In particular, the lower outer extremities of the inlet edges 28 of the rotor 10 are disposed vertically below the inner extremities of the edges 28 by a distance greater than 3% of the total head pumped, i.e. the distance between the liquid surface levels of the sump 36 and the upper reservoir 56. In the sump, fixed guide vanes (not shown) direct the flow to the circular aperture at the lower end 14 of the impeller 10, and prevent pre-rotation of the liquid being pumped. At the lower end, the shape of the rotor's outer shroud 26 changes from a frusto-conical form to a bell-mouth form 10A: this alteration in shape is important to achieve smooth liquid flow into the inlet of the rotor, and a stable variation in pumped flow rate with variation in the level 40 of the lower reservoir 36. A further advantageous feature of the pump is that the flow into the inlet of the impeller 10 from the reservoir sump 36 is substantially unobstructed.

A rotating energy conversion means or diffuser portion 42 which comprises outer and inner inverted frusto-conical shrouds 44 and 46 respectively defining an annular passage 48 having an upwardly increasing diameter is provided above the impeller 10, guide vanes 75 being mounted in the passage 48 between the shrouds 44 and 46.

The diffuser portion 42 is rotatably mounted on the pump shaft 22 by means of an upper radial bearing 50 and a lower radial/thrust bearing 52.

Fluid discharging from the diffuser portion 42 passes through a stationary vaneless diffuser portion 54, conveniently formed by the concrete structure defining aperture 38, the stationary portion 54 being bell-mouthed in shape. The structure defining aperture 38 is situated in a discharge pond 56.

When the impeller 10 as described above is rotated at a suitable operating speed by a motor (not shown) on the upper end of shaft 22, liquid is drawn into the passage 16 and whirl is imparted to the liquid by the impeller vanes 18. The whirl causes the liquid to flow up the inside of the outer shroud 26 of the impeller 10, and a free surface 60 of liquid on the inner diameter of the liquid vortex is formed. The free surface 60 of the liquid is substantially circular in cross-section, although the radial depth of the fluid between adjacent vanes varies in depth from a maximum at the leading surface of a vane. This liquid is then discharged with components of velocity in both a tangential and vertical direction into the rotatable vaned diffuser portion 42 and then into the stationary vaneless diffuser portion 54. As liquid flows spirally up the surface of the diffuser portions 42,54, its velocity energy is recovered as static energy. The curved surface of the stationary vaneless diffuser portion 54 should be formed to permit efficient free vortex diffusion of the liquid as it flows spirally up it.

The pump shaft 22 is driven by an electric motor 70 by way of a gear train 72, a first output 74 from the train rotating the pump shaft 22 and a second output 76 rotating the diffuser portion 42 by means of a tubular connection 78 surrounding the pump shaft 22.

The gears of the gear train 72 are chosen such that the diffuser portion 42 rotates at a slower speed than the pump shaft 22.

In a modified version of the diffusers this modification not being illustrated, the diffuser outer shroud is fixed and the inner shroud with the vanes attached thereto rotates within the outer shroud, a small clearance between vane edges and outer shroud being provided.

In a further modification a plurality of serially arranged diffusers are provided.

Furher modified pumps are constructed in generally similar fashion to those described above, with one significant difference. In this modified form, the outer shroud 26 of the impeller 10 is not attached to the rotor vanes 18, and it does not rotate. The impeller vanes are attached to the coned inside shroud 24 and hub 20 rotated by drive shaft 22, but operate with a fine clearance arranged between their outer extremities and the inner surface of the outer shroud 26.

In a further modifiction (not shown) the outer diameter of the impeller is constant along the length of the impeller, that is the outer shroud is cylindrical.

During the operation of any of the pumps described above, when the level 40 of liquid in the suction sump 36 falls, less liquid is drawn into the impeller 10 due to the downwardly diverging form 28A of the leading ends 28 of the spiral vanes, and consequently the radial depth D of the rotating liquid vortex 16 inside the impeller decreases. Since the whirl imparted to this thinner rotating liquid vortex 16 is little different from that imparted to the radially thicker vortex ring at higher flows, the head generated within the impeller 10 remains nearly the same, and the power requirement of the rotor falls almost proportionately to the reduction in quantity of liquid pumped. Thus both the volumetric flow rate through the pump and the power consumed increase as the level in the sump rises, and decrease as the level in the sump falls. In this way the pump is self regulating, and operates at high efficiencies, from its maximum flow rating down to a very small fraction of this rating. Its performance at best efficiency point comprises favourably with a conventional centrifugal, mixed or axial flow pump, since there is no disc friction loss such as exists in conventional centrifugal and mixed flow pumps, and there is only a small clearance leakage loss between the rotor and the diffuser. Friction losses in the impeller passages of a pump as described and in the rotatable diffuser portion can be minimised, since fluid relative velocities are small in comparison with conventional rotodynamic pumps for the same head, and since it is convenient and economic to manufacture the impeller and diffuser cones and vanes from thin, corrosion resistant sheet metal such as stainless steel or copper alloy, or from reinforced or unreinforced plastic materials, all of which permit a very smooth surface finish. The circular stationary diffusing portion above the rotor may also be made very smooth.

The pumps described above are very suitable for pumping liquids containing solids in suspension, such as sewage and land drainage from storm drains. This suitability stems from the fact that, because of the absence of a pump casing, the pump can be designed to run at lower maximum relative velocities than conventional rotodynamic pumps for similar duties, thus minimising risk of damage through solid impact and abrasive wear. Furthermore, since there is only limited dependence on fine clearances, the problems of maintaining such clearances against abrasion in Archimedean screw pumps and conventional rotodynamic pumps are obviated. The wide spacing of the vanes in the pump permits the pump to handle large solid matter. The handling of such large solid matter may be assisted by mounting a short screw inducer (not shown) at the lower end of the rotor shaft.

The vertical mounting of the pump above the inlet sump and absence of a conventional casing make for minimum installation costs and space requirements. Furthermore, the rotors may be easily lifted vertically to permit inspection and maintenance of components.

The pumps described above, may operate efficiently as turbines for low head duties, when the liquid flow is reversed. The volumetric flow is then controlled by raising and lowering an annular sluice (not shown) at the top of the pump to control the radial depth of spiralling flow into aperture 38, and thereby the power output of the turbine. The turbine has a high maximum efficiency, and maintains a high efficiency over a wide flow range, at constant speed, thus providing a suitable hydraulic power unit for electrical generation.

In turbine form, the embodiments and modifications described above overcome the need for complex multiple gates and variable pitch vanes used for Kaplan and Francis liquid turbines, and offer hydraulic performance which is competitive with that of these machines over a wide flow range.

When a pump as described above is used for liquids containing solids in suspension, the use of rotatable diffuser portion 42 incorporating rotating vanes 75, ensures that positive centrifugal forces are applied from the vanes to all solids, both in the impeller 10 and in the rotatable diffuser portion 42. Thus all solid material entering the bottom aperture in the impeller 10 can be positively driven to the top of the rotatable diffuser portion 42, regardless of the volumetric flow rate of liquid. From the rotatable diffuser portion outlet the kinetic energy in the solid matter, coupled with the drag of the flow of liquid past the solid matter, will generally be sufficient to raise the solid matter up the remaining shallow stationary bell-mouth diffuser portion 54, i.e., to the level of the pump discharge. In cases where exceptionally difficult-to-pump solid material is involved, the top stationary diffuser section 54 may be omitted, with some sacrifice in diffuser efficiency, and therefore some penalty in overall pump efficiency. A wide spacing between the vanes in the rotatable diffuser means that large size solids can be handled within it. It is an advantage of the positive drive to the rotatable portion 42 that flow instabilities in the liquid cannot form.

I claim:

1. A rotary cone pump for raising liquid from a lower reservoir to an upper reservoir, said pump having an inlet for receiving liquid from the lower reservoir and an outlet vertically spaced from the inlet for discharging into said upper reservoir, a rotor mounted on a vertical shaft and including series of axially extending helical vanes the outer diameter of which increases upwardly, a frusto-conical outer shroud surrounding said vanes, the vanes defining with the shroud a plurality of fluid passages extending a sufficient axial distance along the rotor whereby during pumping of liquid in said passages the liquid forms a vortex against the outer shroud, such that a free liquid surface is formed on the radially inner boundary of the vortex, diffuser means above said rotor to receive liquid from the vanes and extending longitudinally thereof and having an outer radius which increases upwardly, and a drive transmission for coupling the diffuser means to a drive motor so that the diffuser means is driven by the drive motor at a speed less than that of the rotor.

2. The pump as claimed in claim 1, wherein the diffuser means and the rotor are driven by way of a gear train by the same drive motor, the gear train ratios being arranged such that the diffuser means is rotated slower than the rotor.

3. The pump as claimed in claim 1, wherein the bottom of the shroud is of bell-mouth form.

4. The pump as claimed in claim 1, wherein the outer shroud rotates with the shaft, the vanes being attached thereto so as to extend inwardly.

5. The pump as claimed in claim 1, including an inner shroud extending from the upper end of a vane carrying hub and supporting the vanes above the hub.

6. The pump as claimed in claim 1, wherein the diffuser means includes guide vanes which are shaped and fixed to an internal shroud thereof.

7. The pump as claimed in claim 1, wherein the diffuser means includes also an annular bell-mouth shaped fixed passage.

8. A rotary cone pump for raising liquid from a lower reservoir to an upper reservoir, said pump having an inlet for receiving liquid from the lower reservoir and an outlet vertically spaced from the inlet for discharging into said upper reservoir, a rotor mounted on a vertical shaft and including a series of axially extending helical vanes the outer diameter of which increase upwardly, a frusto-conical outer shroud surrounding said vanes, the vanes defining with the shroud a plurality of fluid passages extending a sufficient axial distance along the rotor whereby during pumping of liquid in said passages the liquid forms a vortex against the outer shroud, such that a free liquid surface is formed on the radially inner boundary of the vortex, diffuser means above said rotor to receive liquid from the vanes and extending longitudinally thereof and having an outer radius which increases upwardly, means to automatically reduce the depth of the free liquid vortex on the outer shroud when the liquid level in the lower reservoir falls below a predetermined level to thereby control the quantity of liquid pumped dependent on said level, said means being provided by the bottom edges of the axially extending helical vanes extending substantially downwardly and outwardly; and drive transmission for coupling the diffuser means to a drive motor so that the diffuser means is driven by the drive motor at a speed less than that of the rotor.

9. The pump as claimed in claim 8, wherein the diffuser means and the rotor are driven by way of a gear train by the same drive motor, the gear train ratios being arranged such that the diffuser means is rotated slower than the rotor.

10. The pump as claimed in claim 8, wherein the bottom of the shroud is of bell-mouth form.

* * * * *